United States Patent [19]

Liao

[11] Patent Number: 5,550,717
[45] Date of Patent: Aug. 27, 1996

[54] DIRECTION TURNING DEVICE FOR A HEADLIGHT OF AN AUTOMOBILE

[76] Inventor: Winner Liao, No. 27, hsiang 47, san ho road, sec 1., San Chung county, Taipei hsien, Taiwan

[21] Appl. No.: 419,955

[22] Filed: Apr. 10, 1995

Related U.S. Application Data

[63] Continuation of Ser. No. 191,819, Feb. 4, 1994, abandoned.

[51] Int. Cl.$^6$ .......................... B60Q 1/076; B60Q 1/072
[52] U.S. Cl. .................. 362/41; 362/37; 362/66; 362/53; 362/57
[58] Field of Search .................. 362/37, 40, 41, 362/61, 80, 66, 53, 54, 57, 59

[56] References Cited

U.S. PATENT DOCUMENTS

| | | | |
|---|---|---|---|
| 1,082,763 | 12/1913 | Powell | 362/41 |
| 1,226,133 | 5/1917 | Spirewfki, Jr. | 362/41 X |
| 1,227,993 | 5/1917 | Brainard | 362/57 |
| 1,400,117 | 12/1921 | White | 362/41 |
| 1,460,540 | 7/1923 | Elledge | 362/53 |
| 1,789,193 | 1/1931 | Riess | 362/41 |
| 1,887,828 | 11/1932 | Tritton | 362/41 |
| 2,050,770 | 11/1936 | Tritton | 362/41 X |
| 3,116,026 | 12/1963 | Gupta | 362/57 |
| 4,768,135 | 8/1988 | Kretschmer et al. | 362/66 |

FOREIGN PATENT DOCUMENTS

| | | | |
|---|---|---|---|
| 686353 | 1/1931 | France | 362/37 |

*Primary Examiner*—Denise L. Gromada
*Assistant Examiner*—Thomas M. Sember

[57] ABSTRACT

A direction turning device for headlights of an automobile comprises two operation mechanisms, namely, direct operation mechanism and electromagnetic operation mechanisms. For the direct operation mechanism, if an automobile with lefthand drive, the device is connected to the left headlight; if an automobile with righthand drive, the device is connected to the right headlight. Where, the electromagnetic operation mechanism is connected to both left and right headlights and activated synchronously with the steering system. This disclosure has been characterized in the simplized structure and the longevity of use because the electromagnetic mechanism is turned off during daytime driving.

5 Claims, 5 Drawing Sheets

DIRECTION TURNING DEVICE FOR A HEADLIGHT OF AN AUTOMOBILE

This is a continuation of application Ser. No. 08/191,819, filed Feb. 4, 1994, now abandoned.

BACKGROUND OF THE INVENTION

The present invention relates to headlights of an automobile, more particularly to a direction turning device for headlights of an automobile which enables to turn direction synchronously with the rotation of the steering and hence increasing the safety for driving at night or in the darkness.

In the known technology of the prior art, a headlight of an automobile has a fixed line of emission which is aligned with the front direction of the automobile. Although the effects of "high beam" or "low beam" can be achieved by adjusting the angle of elevation of the headlight, the direction of emission is not adjustable as to the left or right. When the road curves or turns, the corner on time when the car turns, thereby creating a dead angle of illumination and such lack of visibility poses danger in driving at night or in darkness.

Therefore, it is highly desirable to invent a device to solve this problem and such device is of high utility.

SUMMARY OF THE PRESENT INVENTION

An object of the present invention is to provide a direction turning device for a headlight of an automobile which renders to emission direction of a headlight of an automobile in synchronization with steering and thus increases the illuminated area upon changes of direction of the automobile when the automobile makes turns.

The present invention of a direction turning device for a headlight of an automobile has two operation mechanisms, namely, direction operation mechanism and electromagnetic operation mechanism.

The direct operation mechanism of the present invention comprises:

a curved cover inside a housing of a headlight, a movable frame connected to the curved cover, a reflector having a light bulb in the center fixed to the movable frame, a spool together with a spring on a rotating axis of the movable frame, a control cable having a first end connected to the spool, and a second end extending outside the curved cover and around a turning point and then connected to a positioning clamp, and an oscillating arm held by the positioning clamp and connected to a steering system of the automobile for swaying the movable frame towards a direction upon the turning of the automobile.

The direct operation mechanism of the present invention is connected to only one headlight of the automobile alternatively. For an automobile with lefthand drive such as in England and Japan, the device is connected to the left headlight; for an automobile with righthand drive such as in U.S.A. and Taiwan, the device is connected to the right headlight.

The electromagnetic operation mechanism of the present invention operates both of the left and right headlights of above recited structure. Additional elements are accommodated as follows:

an electromagnetic actuator which actuator comprises a fitting seat member having a fitting cavity set at a bottom end of a positioning clamp, a rocking rod connected to fitting seat member in the middle of fitting cavity, a moving member connected to the rocking rod, a base member connected to the rocking rod and the control cables, and an oscillating arm being held by the positioning clamp and connected to a steering system of the automobile for swaying the movable frame towards a direction upon the turning of the automobile.

The base member of the electromagnetic actuator is connected to two control cables, a first control cable is connected to a first turning point and the left headlight of the automobile and a second control cable is connected to a second turning point and the right headlight of the automobile.

When the headlights are off, the electromagnetic actuator is inactivated and the movable member is separated from the seat member and thus the electromagnetic operation mechanism of the present invention does not operate.

When the headlights are on, the electromagnetic actuator is activated and the movable member is attracted by electromagnetic force into the fitting cavity of the fitting seat member forming unified body, thus rendering the control cables controllable by the oscillating arm so that the device of the present invention is operatable.

The advantages of the electromagnetic operation mechanism are in the elimination of the preset torque applied to the spring and reduction of consumption of the various parts of the device.

Since the device is turned off during daytime driving, it elongate the life to use.

The present invention will be more fully understood by reference to the following detailed description thereof when read in accompanying with the attached drawings.

DETAIL DESCRIPTION OF THE PREFERRED EMBODIMENT OF THE PRESENT INVENTION

Figure 1:
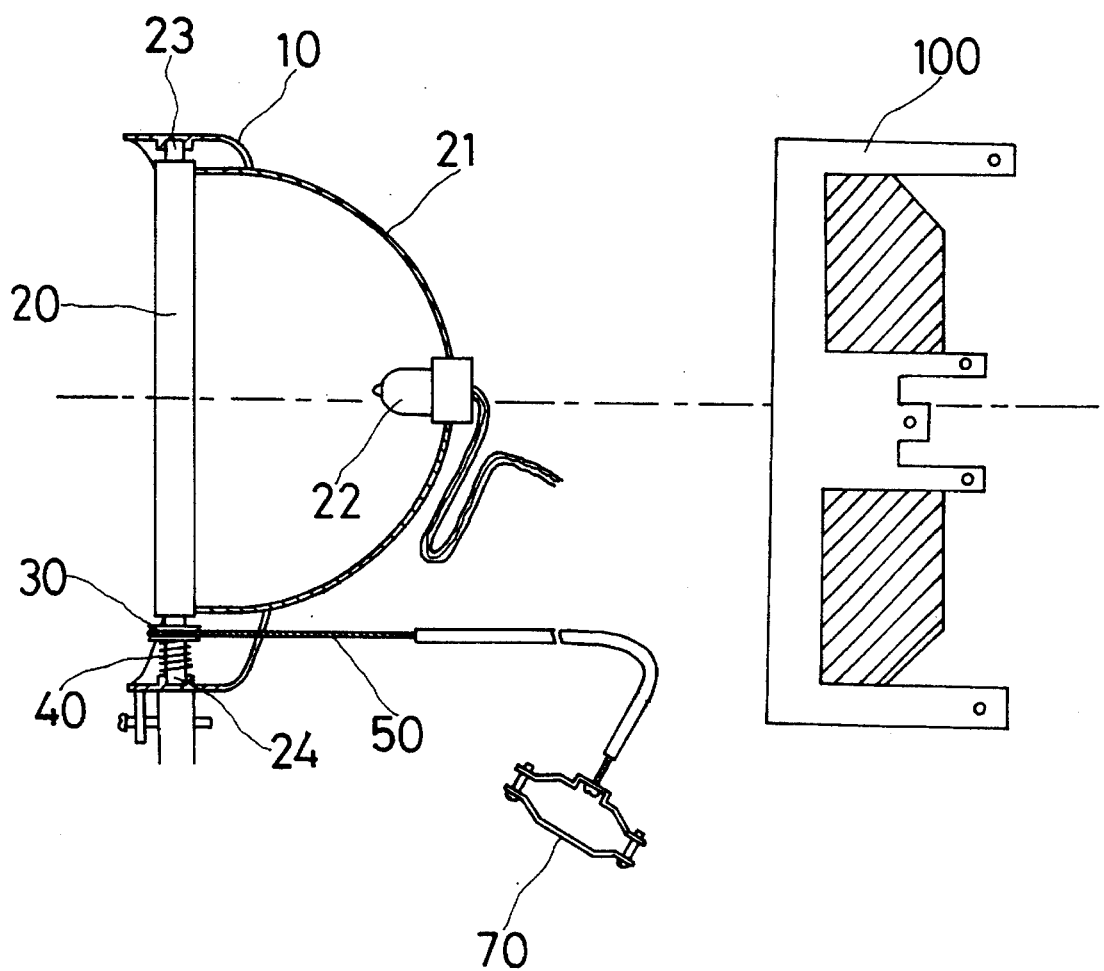
FIG. 1, is an analytical illustration showing the elements of a preferred embodiment of the present invention of a direction turning device for a headlight of an automobile.
Figure 2C:
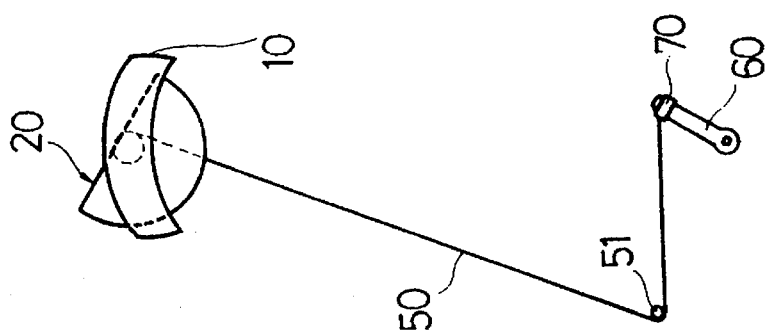
FIGS. 2A to 2B, illustrate the positions of the elements of the direct operation mechanism of the present invention when the automobile is steered to the left and right.

Referring to FIGS. 1 and 2, the direction operation mechanism of the present invention of a direction turning device for a headlight of an automobile comprises:

a curved cover 10 inside a housing 100 of a headlight, a movable frame 20 having an upper rotating axis 23 and a lower rotating axis 24 which are pivotally connected to the curved cover 10, a reflector 21 having a rubidium light bulb 22 in the center and fixed to the movable frame 20, a spool 30 perpendicularly fixed on said lower rotating axis 24 of the movable frame 20, a spring 40 underneath the spool 30 and surrounding the lower rotating axis 24, an upper end of the spring 40 secured at the spool 30 and a lower end thereof secured at the curved cover 10. The spring 40 has a preset torque angle of about 90 degrees to the left for a left headlight or to the right for a right headlight in order to maintain a recoiling action therebetween, a control cable 50 having a first end connected to said spool 30, and a second end extending outside said curved cover 10 and around a turning point 51 at the bottom of the automobile and then connected to a positioning clamp 70, and an oscillating arm 80 held by said positioning clamp 70 and connected to a steering system of the automobile for swaying the movable frame 10 towards a direction of turn of the automobile.

Figure 2B:
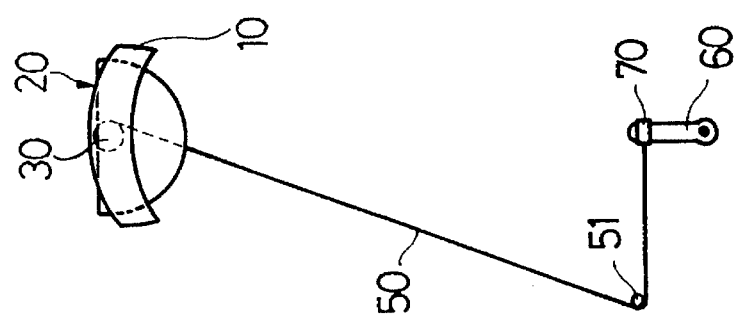
Figure 2A:
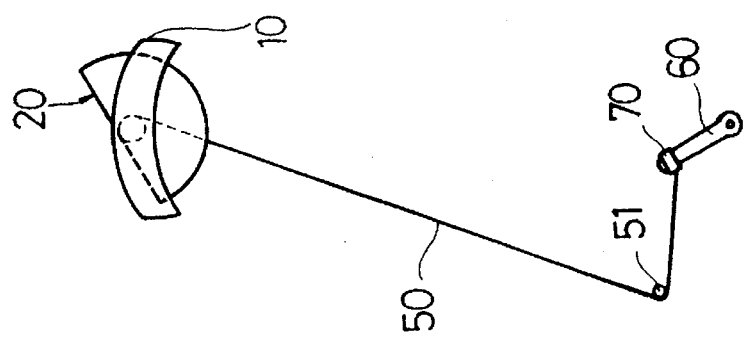

Referring to FIG. 2A, when the automobile is travelling forward in a straight line as the steering wheel and oscillating arm 80 turn to the left. During this time, the displacement of the oscillating arm 60 to the left releases the tension of the control cable 50 and allows the torque exerted by the spring 40 to turn the movable frame 20, reflector 21 and bulb 22 to the left, thus changing the direction of light emission to the left.

Referring to FIG. 2B, for the automobile making a right turn, the steering wheel moves the oscillating arm 60 to the right. During this time, the displacement to the right of the oscillating arm 60 via the control cable 50 turns the movable frame 20, reflector 21 and bulb 22 to the right, thus changing the direction of light emission to the right.

When the automobile resumes its travelling forward in a straight line after making a turn, the steering wheel and oscillating arm 60 are kept in a central position again and the torque exerted by the present angle of the spring 40 is again nullified by the tension of the control cable 50, thus keeping the movable frame 20, reflector 21 and bulb 22 pointing forward again (as shown in FIG. 2B).

Therefore, this direct operation mechanism of the device of the present invention renders the emission direction of a headlight of an automobile in synchronization with steering and thus increases automobile for the headlight to shine around corners when the automobiles makes turns.

Figure 3:
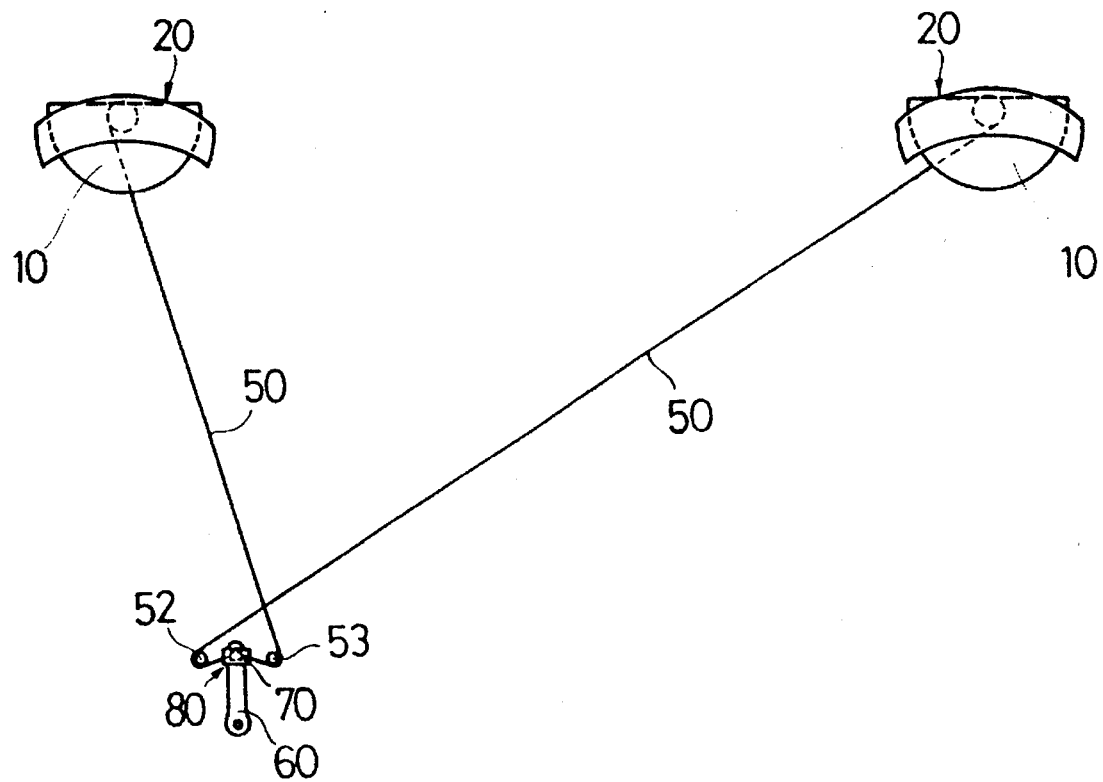
FIG. 3, is an illustrative diagram of the elements of the electromagnetic operation mechanism of the present invention.
Figure 4A:
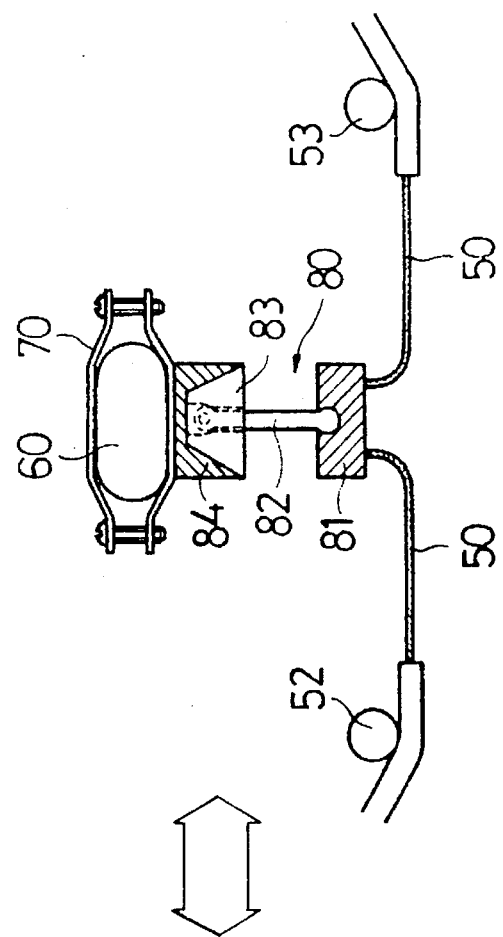
FIGS. 4A to 4B, illustrate the positions of the parts of an electromagnetic actuator for the electromagnetic operation mechanism of the present invention.
Figure 4B:
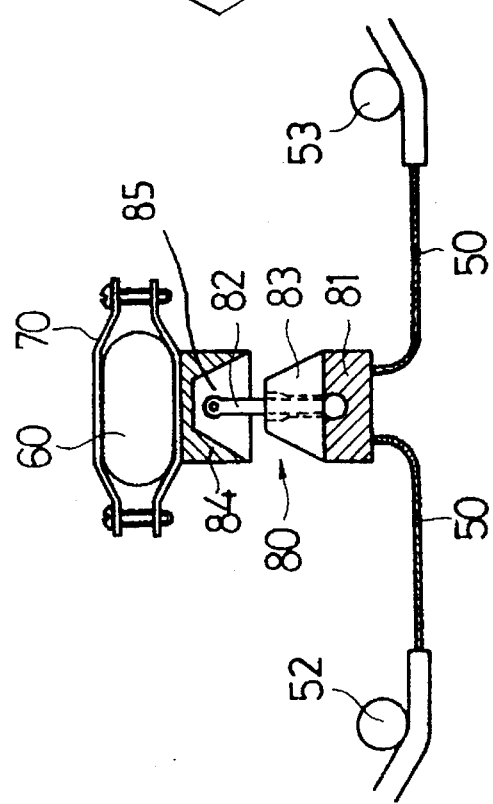

Referring to FIGS. 1, 3 and 4A, the electromagnetic operation mechanism of the present invention of a direction turning device for a headlight of an automobile operates both the left and right headlights of the automobile of the above recited structure. Additional elements are described as follows:

a pair of control cable 50 having their first ends connected to the respective spools 30 of the headlights and their second ends extending outside the curved covers 10 and around the turning points 52 or 53 at the bottom of the automobile and then connected to an electromagnetic actuator 80. The electromagnetic actuator 80 comprise a seat member 84 which is made from rigid plastic material and set at a bottom end of the positioning clamp 70, having a taper shaped fitting cavity 85 and an electrical coil above the cavity 85, a non-magnetic rocking rod 82 hingedly connected to the seat member 84 in the middle of the taper shaped fitting cavity 85, a taper shaped magnetic moving member 83 having central bore slidingly connected to the rocking rod 82, and a non-magnetic base member 81 fixedly connected to the rocking rod 82 and the control cables 50, respectively.

An oscillating arm 60 is held by the positioning clamp 70 and connected to a steering system of the automobile for awaying the movable frame 20 towards a direction of turn of the automobile. However, the base member 81 together with the cables 50 remain stationary when the moving member 83 stays outside the fitting cavity 85 of the seat member 84 (as shown in FIG. 4A).

Figure 5A:
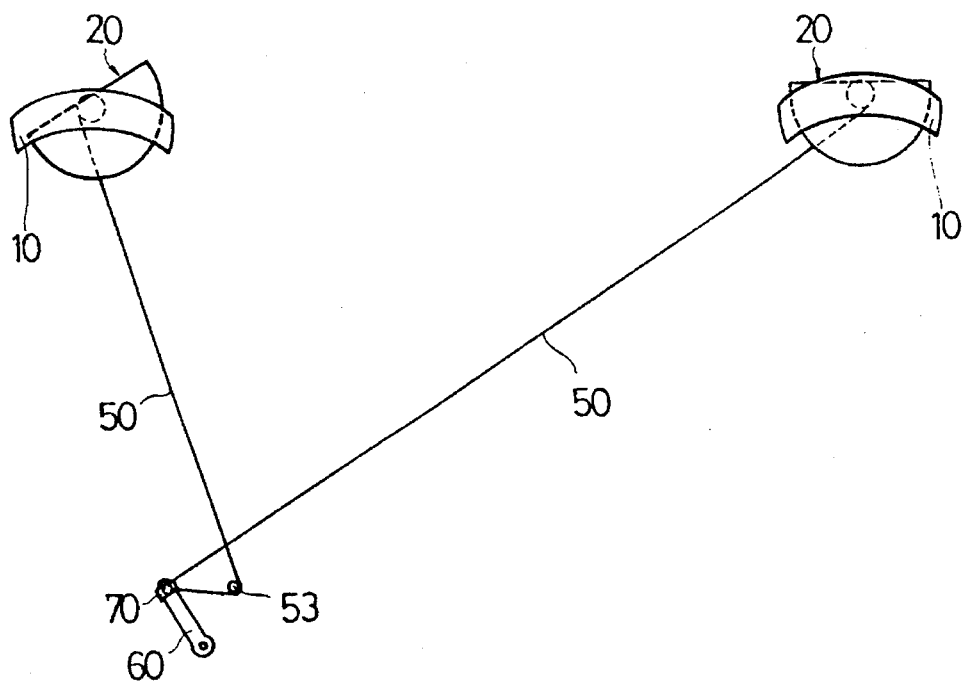
FIGS. 5A to 5B, illustrate the positions of the elements of the electromagnetic operation mechanism of the present invention when the automobile is steered to the left and right.
Figure 5B:
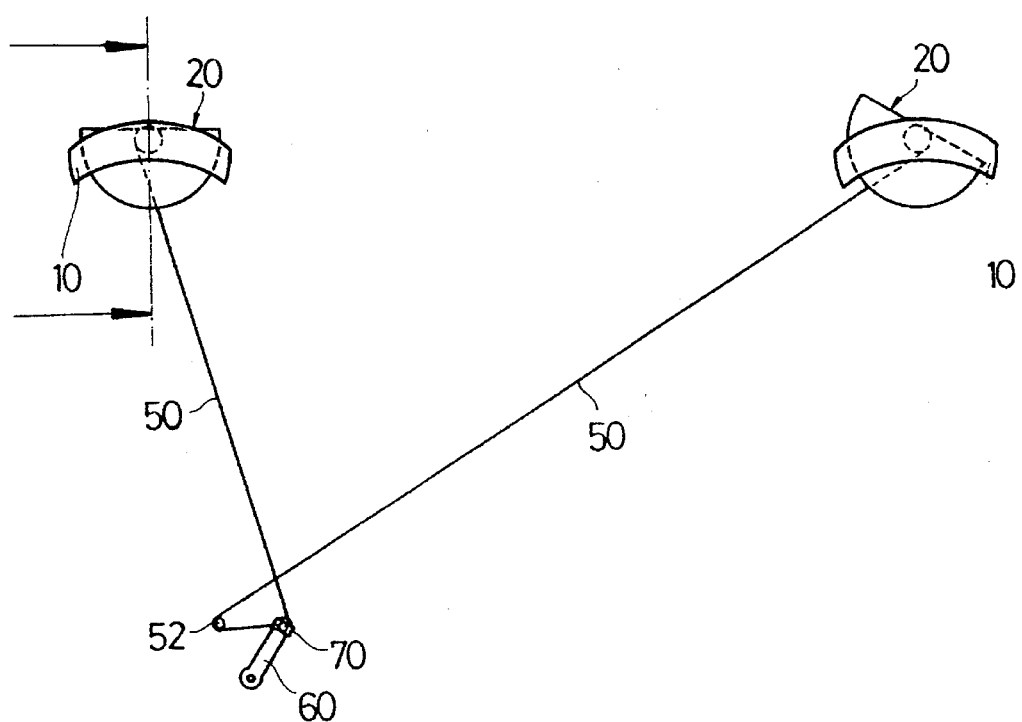

Referring to FIGS. 3, 5A and 5B, in the electromagnetic operation mechanism of this device of the present invention, both the headlights and electromagnetic actuator 80 are fed by the same power source of the automobile. During driving in daytime and the headlights are off, the electromagnetic actuator 80 is in activated and the movable member 83 drops back to stop against the base member 81 and the reflector 21 and bulb 22 are kept in the central position and thus the electromagnetic operation mechanism of the present invention does not operate.

The base member 81 of the electromagnetic actuator 80 is connected to two control cables 50, a first of the control cables 50 is connected to a first turning point 52 and left headlight of the automobile and a second of said control cables 50 is connected to a second turning point 53 and right headlight of the automobile.

When the headlights are on, the same power source activates the electrical coil inside the seat member 84 of the electromagnetic actuator 80 and the movable member 83 is attracted by electromagnetic force of the electrical coil into the fitting cavity 85 of the seat member 84 forming a unit body, thus rendering the control cables 50 in synchronization with the oscillating arm 60 and the device of the present invention is operatable.

Referring to FIG. 3, when the electromagnetic actuator 80 is activated and the automobile is travelling forward in a straight line, the steering wheel and oscillating arm are in a central position keeping the movable frame 20, reflector 21 and bulb 22 of each of left and right headlights pointing forward in a straight line.

Referring to FIG. 5A, when the automobile making a left turn, the steering wheel moves the oscillating arm 60 to the left. During this time, the oscillating arm pulls the control cable 50 in the left causing the moving frame 20, reflector 21 and bulb 22 of the left headlight to turn to the left for illuminating to that direction. At the same time, the oscillating arm 60 also releases the tension of the control cable 50 in the right. Since the spring 40 for the electromagnetic operation mechanism is not preset for a torque, the moving frame 20, reflection 21 and bulb 22 of the right headlight remain in a central position. Thus, the left headlight illuminates to the left and the right headlight illuminates straight ahead.

When the automobile resumes its travelling forward in a straight line after making a turn, the steering wheel and oscillating arm 60 are kept in a central position again and the spring 40 of the left headlight returns the moving frame, reflector 21 and bulb 22 to their normal position of pointing straight forward.

Referring to FIG. 5B, when the automobile making a right turn, the steering wheel moves the oscillating arm 60 to the right. During this time, the oscillating arm pulls the control cable 50 in the right causing the moving frame 20, reflector 21 and bulb 22 of the right headlight to turn to the right for illuminating to that direction. At the same time, the oscillating arm 60 also releases the tension of the control cable 50 in the left. Since the spring 40 for the electromagnetic operation mechanism is not preset for a torque, the moving frame 20, reflector 21 and bulb 22 of the left headlight remain in a central position. Thus, the right headlight illuminates to the right and the left headlight illuminates straight forward.

When the automobile resumes its travelling forward in a straight line after making a turn, the steering wheel and oscillating arm 60 are kept in a central position again and the spring 40 of the right headlight turns the moving frame, reflector 21 and bulb 22 to their normal position of pointing straight forward.

Therefore, this electromagnetic operation mechanism of the device of the present invention renders the emission direction of a headlight of an automobile in synchronization with steering and thus increases the illuminated area upon changes of direction of travel of the automobile for the headlight to shine around corners when the automobile makes turns.

I claim:

1. A direction turning system for a left and right headlight of an automobile comprising:

a left and right headlight assembly, each headlight assembly comprising:

a curved cover inside a housing of said headlight;

a movable frame having an upper rotating axis and a lower rotating axis pivotally connected to said curved cover respectively, a reflector having a light bulb in a center of the reflector and being fixed to said movable frame, a spool perpendicularly fixed on said lower rotating axis of said movable frame;

a spring underneath said spool and surrounding said lower rotating axis, said spring having an upper end secured at said spool and a lower end secured adjacent an inside of said curved cover;

said turning system further comprising:

a pair of control cables having their first ends connected to said spools of said left and right headlight assemblies and their second ends extending outside said curved covers and around a respective turning point at a bottom of said automobile and then connected to an electromagnetic actuator, said electromagnetic actuator comprising a seat member set at a bottom end of a positioning clamp, having a fitting cavity, a rocking rod hingedly connected to said seat member in said fitting cavity, a moving member slidingly connected to said rocking rod, and a base member connected to said rocking rod and said control cables, and an oscillating arm being held by said positioning clamp and connected to a steering system of said automobile, wherein said oscillating arm sways said movable frame of said headlights toward a direction of a turn of said automobile.

2. A direction turning device according to claim 1, wherein said fitting cavity of said seat member is tapered shaped.

3. A direction turning device according claims 1 or 2 further has an electrical coil inside said seat member above said fitting cavity.

4. A direction turning device according to claim 1, wherein said movable member is a tapered shaped magnet having a central bore therein.

5. A direction turning device according to claim 1, said electromagnetic actuator is electrically connected with said headlights.

\* \* \* \* \*